W. B. MEHL.
PALLET END STONE CAP FOR WATCH MOVEMENTS.
APPLICATION FILED JULY 17, 1909.

981,667.

Patented Jan. 17, 1911.

WITNESSES:
M. Van Nortwick
Parker Cook

INVENTOR
Walter B. Mehl
BY George Clark
ATTORNEY

UNITED STATES PATENT OFFICE.

WALTER B. MEHL, OF WALTHAM, MASSACHUSETTS, ASSIGNOR, BY MESNE ASSIGNMENTS, TO THE KEYSTONE WATCH CASE COMPANY, OF PHILADELPHIA, PENNSYLVANIA, A CORPORATION OF PENNSYLVANIA.

PALLET-END-STONE CAP FOR WATCH-MOVEMENTS.

981,667.     Specification of Letters Patent.     Patented Jan. 17, 1911.

Application filed July 17, 1909. Serial No. 508,111.

*To all whom it may concern:*

Be it known that I, WALTER B. MEHL, a citizen of the United States, and a resident of Waltham, in the county of Middlesex and State of Massachusetts, have made and invented certain new and useful Improvements in Pallet-End-Stone Caps for Watch-Movements, of which the following is a specification.

My invention relates to an improvement in watch movements, and more particularly to the construction and arrangement of means for retaining the pallet end-stone cap in its proper position. The retention of this member in a watch movement, has heretofore caused much trouble to the manufacturer and repairer, in that the part is so small that great difficulty has been experienced in properly securing it in place. In the construction of a watch movement, this member has heretofore been made semi-circular in form, and secured to the pallet bridge by means of one short screw about fifteen one-thousandths of an inch in length, and containing approximately two hundred and fifty threads to the inch. It will therefore be understood that the slightest undue strain placed upon the screw in turning the same home, will strip the thread, thereby rendering it useless, and in many instances necessitating the re-tapping of the threaded opening in the pallet bridge to which it is secured, and in some instances necessitating a special larger screw, and in other instances, the renewal of the entire pallet bridge. Even when the parts are accurately made and fitted, this minute screw is insufficient to always hold the cap in place, and any slight lateral pressure thereon will necessarily disturb the relation between the several parts. In my improved movement, I have overcome this difficulty by forming this cap in somewhat the form or shape of a keystone to be retained in a recess formed in the pallet bridge, having inclined sides to correspond with the inclined sides of the cap, and providing sufficient stock in the bridge to receive and retain two screws of considerably greater length than the one heretofore used.

Figure 1:
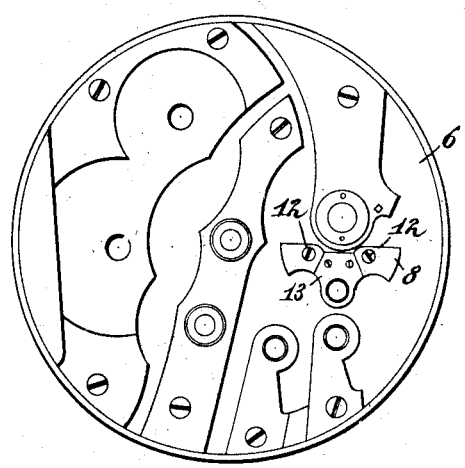
Figure 2:
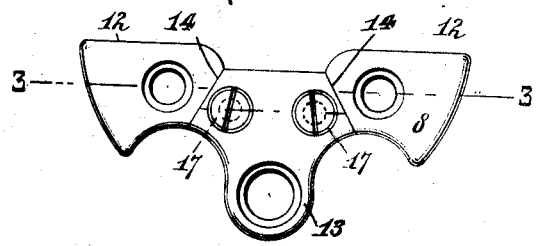
Figure 3:
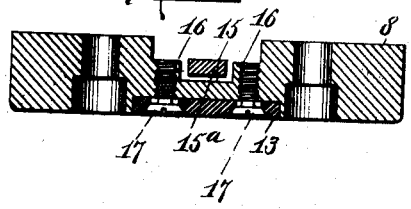

In the accompanying drawings, Figure 1 is a plan view of a part of a watch movement showing my improved means for retaining the pallet end-stone cap in position. Fig. 2 is a detached plan view showing the means for retaining the pallet end-stone cap in its proper position on the pallet bridge. Fig. 3 is a sectional view taken on the line 3—3 of Fig. 2, a pallet fork being also shown in section.

Referring to the drawings, it will be seen that the pallet bridge 8 is secured to the dial plate 6 by means of the two screws 12, the upper surface of the bridge being cut away to receive the cap 13, the latter having the outline, as clearly illustrated in Figs. 1 and 2, that is, with the inclined edges 14 to fit against similarly inclined edges of the recess in the bridge, whereby to provide against any lateral movement of the cap. The under side of this bridge is also cut away, as illustrated at 15, (Fig. 3), the stock or metal of which the bridge is formed, being carried downwardly into this recess to form the lugs 16, and tapped to receive the retaining screws 17, said lugs 16 permitting of the use of screws of much greater length than has formerly been possible. It will be understood, of course, that this recess 15 in the under side of the bridge is absolutely essential to accommodate the pallet fork 15ª, and hence the thickening of the metal of this part of the bridge is impossible, the consequence being that heretofore a single minute screw has been utilized for holding the pallet end-stone cap 13 in its position on the bridge. As before stated, the length of the screw heretofore used has been approximately but fifteen one-thousandths of an inch, and contains about two hundred and fifty threads to the inch. It will therefore be readily understood that any undue strain placed upon this minute screw will necessarily strip it of its threads, and permit of the displacement or movement of the cap on the bridge. By shaping the cap as above described, that is, giving it approximately the form of a keystone to fit in a correspondingly shaped recess in the bridge, and by thickening the metal on the sides of the recess to form the lugs 16, to permit of the use of two comparatively longer screws, the objections to the former construction of bridge and cap have been overcome, and all danger of the displacement or movement of the cap on the pallet bridge, obviated.

From the foregoing it will be understood that my invention is exceedingly simple, and, as has been shown in practice, the improved means of securing the pallet end-stone cap in place, permits of the easy and ready location of said cap, and operate as a positive lock against accidental movement of the several parts; furthermore, these means tend to prevent danger of stripping the threads on the small retaining screws and bridge, and also relieve the screws of a large part of the strain imposed upon them.

Having fully described my invention, what I claim as new and desire to secure by Letters Patent, is:—

1. In a watch movement, the combination with a dial plate, of a pallet bridge secured thereto and formed with a recess having inclined sides, a pallet end-stone cap having inclined sides fitting in said recess in said pallet bridge, and screws for securing said bridge and cap in their proper relative positions, substantially as described.

2. In a watch movement, the combination with a dial plate, of a pallet bridge secured thereto, and provided with a recess having inclined sides, a pallet end-stone cap having inclined sides and fitting in said recess in said pallet bridge, and screws passing through said cap and into said bridge for holding the parts in their proper relative positions, substantially as described.

3. In a watch movement, the combination with a dial plate, of a pallet bridge secured thereto and provided on one side with a recess having inclined sides, and on the opposite side with lugs, a pallet end-stone cap provided with inclined sides and fitting in the recess in said pallet bridge, and screws passing through said pallet end-stone cap and into the lugs formed in said pallet bridge, substantially as described.

Signed at Waltham, in the county of Middlesex, and State of Massachusetts, this thirteenth day of July, A. D. 1909.

WALTER B. MEHL.

Witnesses:
R. SCHMIEDTGEN,
E. R. SNOW.